May 2, 1967  J. C. BLOME ET AL  3,317,455
THERMAL INSULATION AND ABLATION MATERIAL
Filed Jan. 21, 1963
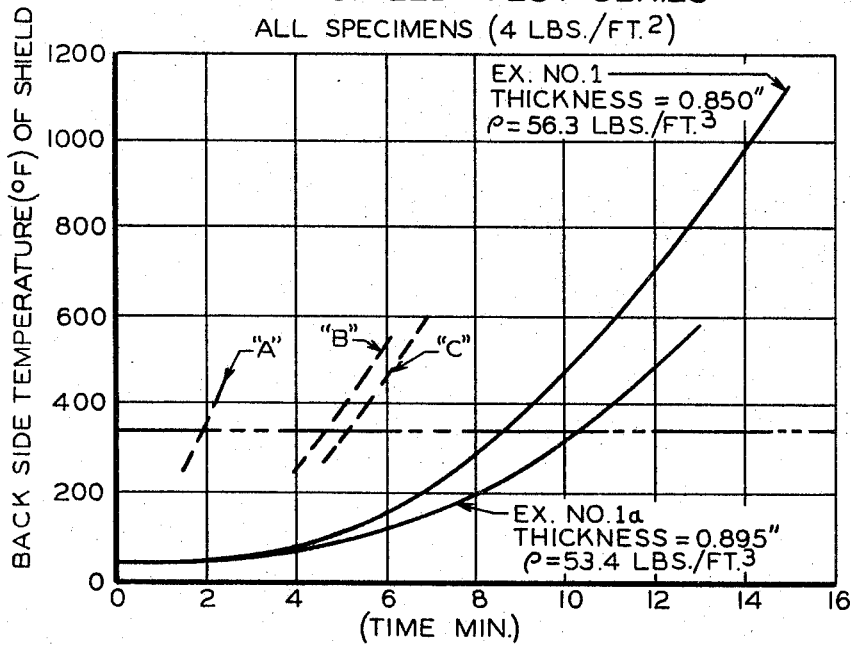
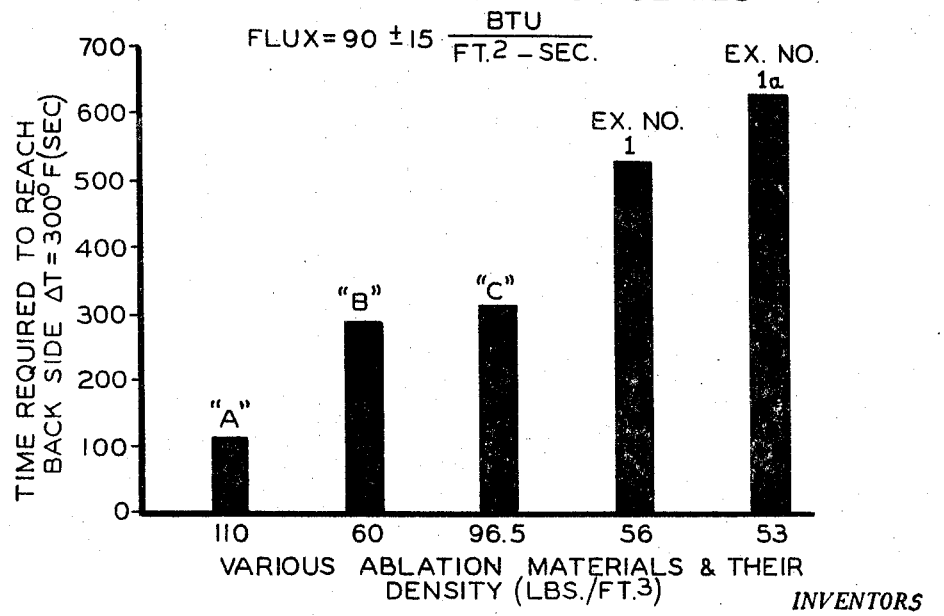
INVENTORS
JAMES C. BLOME
EDWARD M. KERN
DONALD L. KUMMER
BY Gravely, Lieder & Woodruff
ATTORNEYS

3,317,455
THERMAL INSULATION AND ABLATION MATERIAL

James C. Blome, Bridgeton, and Edward M. Kern and Donald L. Kummer, Florissant, Mo., assignors to McDonnell Aircraft Corporation, St. Louis, Mo., a corporation of Maryland
Filed Jan. 21, 1963, Ser. No. 252,926
5 Claims. (Cl. 260—37)

The present invention relates to a thermal insulation material having high temperature resistance and particularly relates to a flexible elastic thermal insulation and ablation material.

This application is a continuation-in-part of our co-pending application Blome, Kern and Kummer, Ser. No. 177,364, filed Mar. 5, 1962, now abandoned, entitled, Thermal Insulation and Ablation Material.

One of the principal objects of the present invention is to provide a versatile thermal insulating material which may be applied to a subsurface by a variety of methods; specifically, by trowelling, by forming the material into a flat flexible sheet and bonding to the subtrate, by preforming the thermal insulation into the desired shape of an irregular substrate and bonding thereto, and by molding the material, in place, to the substrate.

Another object is to provide a material which is flexible, tough, temperature resistant, thermally efficient over a wide range of environments and which can be formed and applied to a variety of configurations and substances by many different simple conventional methods.

Another object is to provide an elastomeric coating material filled with inorganic fibers and other thermal insulating materials.

Another object of the present invention is to provide a material which can be applied in any desired thickness in a single coating by molding, trowelling or bonding of pre-formed sheets. Another object is to provide an insulating material which has no shrinkage upon curing and which can be cured at a relatively moderate temperature (approximately 120° F.), and even will cure at room temperature, although in this instance relatively long curing times are required.

Another object of the present invention is to provide an integral thermal insulating sheet having a relatively tough skin and a uniform consistency throughout, said sheet not requiring special facing or stitching to provide structural strength. Another object is to provide an insulating material having a high specific heat, low density and low thermal conductivity.

Still another object is to provide a thermal insulating material usable at 500° F., and up to 950° F. for short times, which also is an ablation material usable at temperatures of +4000° F., said material having good mechanical integrity and being suitable for one coat application of the required thickness to regular and irregular, metallic and non-metallic surfaces by a variety of simple conventional methods.

Another object is to provide very efficient ablative material which also is a good passive insulator. Still another object is to provide a material wherein the components may be varied within given ranges to vary the density and thermal conductivity of the material.

These and other objects and advantages will become apparent hereinafter.

The present invention is useful as a thermal insulating material to protect the irregular, rivet studded structure of jet engines; it can be applied as an outer coating to supersonic missiles; and it can be used as an ablation coating for the leading re-entry surface of space type vehicles.

Although there are numerous thermal insulation materials commercially available, many of which are thermally efficient, most of these materials lack good mechanical integrity. These materials must be covered on their outer surface to protect against handling and surface damage and/or to facilitate attachment to the surface which they cover. Materials which have good mechanical strength also are available, but these materials are difficult and expensive to form and apply to the configuration or substrate requiring thermal insulation. For example, some of these materials are made into rigid bodies of fixed dimensions and shapes which are then difficult to match to the substrate or configuration requiring thermal protection. Also, some substances require numerous thin coatings to build up to the final required thickness. Insulating materials are available which may be formed and applied to complex configurations or substrates; however, these materials lack thermal efficiency.

The present invention provides a novel, unique, and versatile heat insulation and ablation product which may be applied in its wet form in a single coating to intricate shapes. The present product also may be formed into sheets and applied to irregular subsurfaces. The present product further may be manufactured in sheets which can be conformed and bonded to the particular configuration required. The present product is particularly applicable to technical and refined applications such as aerospace products.

The present invention comprises a heat insulating and ablation material including a curable fluid silicone base containing hollow particles and fibrous material in predetermined proportions and which may include anti-flaming materials and various curing agents and binders to give desired curing rates, viscosities, and other characteristics.

The present invention further comprises the thermal insulating and ablation material and the method of making same hereinafter described and claimed FIG. 1 is a graph showing ablation results of the present composition and conventional ablation materials, and FIG. 2 is a chart taken at the 375° vertical axis of FIG. 1.

The present invention includes a fluid silicone curable to a solid which acts as a binder and which is tough and flexible; fibrous inorganic fibers which provide a high opacity to thermal radiation, high strength and toughness, a relatively strong char layer when the resin is overheated, and reduce conductive heat transfer; low density, cellular particles which minimize conductive and convective heat transfer and reduce the weight of the total composite; and optionally may include an anti-flaming material which makes the composite self-extinguishing when heated to a very high temperature in moving air. The resin binder is a relatively temperature stable polymeric material, preferably curable fluid silicone, which is tough and flexible or semi-flexible. The silicone binder includes one or more components which may or may not contain solvent thinners or other diluents and curing agent.

The fibrous inorganic material preferably is potassium titanate fibers which stop much of the thermal radiation and therefore stop much of the heat transfer. Other long fibers, such as asbestos impart strength to a composite when they are blended and interlocked. The material may or may not include the asbestos, depending on the desired final properties. Other possible fibers having similar properties include glass fibers, zirconia fibers, glass flakes (ground), and alumina flakes.

The low density cellular particles can be closed cell or semi-closed cell particles such as glassy spheres, expanded cellular perlite, or expanded mica, plastic spheres, fused clay spheres, SiO₂ spheres, alumina spheres, or zirconia spheres.

A strong char layout is very important in ablation applications and silica is preferred for this purpose. The silica is put into the composition as spheres of SiO₂ and is formed when the curable fluid silicone decomposes in air. Thus, curable fluid silicones and spheres of SiO₂ are used when an ablation environment is present. Other common glass spheres or plastic spheres may be used when an ablation environment is not present.

Up to about 5% of an anit-flaming material, such as boric acid, sodium bicarbonate and ammonium phosphate, may be added to retard flammability when the present material is exposed to high temperatures in the presence of air. The preferred compositions include about 1% boric acid.

The amount of fibrous materials is between about 2.5% and about 26.5% by weight of the total composition.

The amount of cellular material is between about 5% and about 22.5% by weight of the total composition.

The optimum amount of a mixture of fibrous materials and cellular material is between about 5% and 26.5% by weight of the total composition, and preferably between about 15% and about 25% of the weight of the final material. The foregoing listed ranges of materials will vary somewhat depending on the viscosity of the silicone binder and the particular type of cellular or fibrous material which is used, since the amount of a solid material which can be loaded into a liquid vehicle depends on the amount of area possessed by a unit weight of the solid material.

Small amounts, on the order of 2% by weight, of inert substances such as Al₂O₃, TiO₂, and SiO₂ can be added to the basic formulation without materially affecting the properties of the final insulation materials.

The liquid portion of the present composition is from about 70% to about 95% by weight of the composition, at least 50% of which should be curable fluid silicone. Preferably, the liquid component is about 80% of the total composition and is 100% curable fluid silicone. In addition to the polymeric silicone, the liquid components may include a curing agent for the polymeric silicone and suitable organic solvents and thinners, such as toluene, etc. Suitable commercially available curable fluid silicones include SR-98 silicone resin, SR-17 silicone resin, and LTV-602 silicone rubber manufactured by General Electric Company. Other curable fluid silicones include DC-2106 silicone resin and Sylgard 182 silicone resin manufactured by Dow Corning Corporation.

SR-17 is a copolymer of 50 mol percent dimethylsiloxane, 40 mol percent monophenylsiloxane and 10 mol percent diphenylsiloxane.

SR-98 is a copolymer of 58 mol percent monomethylsiloxane, 17.5 mol percent of dimethylsiloxane, 18 mol percent monophenylsiloxane and 6.5 mol percent diphenylsiloxane.

DC-2106 is a copolymer of 63 mol percent monomethylsiloxane, 28 mol percent monophenylsiloxane and 9 mol percent diphenylsiloxane.

The solvents and thinners are used to vary the viscosity of the final product.

The curable fluid silicone is preferably used without a solvent which when cured is a solid either resinous in nature or a flexible silicone elastomer. Thus, SR-98, SR-17 and DC-2106 hereinbefore referred to are each substantially rigid resins when cured, whereas, LTV-602 is, when cured, a silicone rubber of substantial flexibility and extensibility. Sylgard 182 is a more flexible resin than the above but does not have the extensibility of a rubber.

Any of various curing systems known in the silicone field may be employed in connection with the present invention. Thus, the resins such as SR-98, SR-17 and DC-2106 may be cured with catalysts such as metal salts of carboxylic acids such as lead octoate, zinc napthenate, stannous octoate or dibutyltindiacetate or with quaternary ammonium salts such as benzyltrimethyl ammonium octoate. Alternatively, organic peroxide such as benzoyl peroxide may be employed for establishing bonds between organo substituents in the silicone as is well known in the art. Alternatively, other cross-linking systems may be used for curing the silicone.

Other known curing systems may be employed based upon special substituents bonded to silicon in the siloxane Thus, the siloxane may contain both alkoxy and hydroxy substituents and a catalyst such as tetramethylguanidine employed for intercondensation therebetween. LTV-602 is an illustration of this system. Another system based on special substituents on the silicon atoms in the silicone is the one in which the silicone carries hydrogen and vinyl substituents which are condensed by the use of a platinum catalyst. Sylgard 182 is an illustration of this type of system. Likewise, radiation may be employed for curing of the siloxane as is known in the art.

The silicone employed in accordance with this invention is preferably one in which the organo substituents are monovalent hydrocarbon radicals such as phenyl, methyl and vinyl radicals and in which other substituents present are incondensible for purposes of curing the fluid silicone to a solid. As hereinbefore indicated such substituents include vinyl and hydrogen for one system, alkoxy and hydroxy for another system, and may also include such readily hydrolyzable substituents as alkoxy which provide sites for intercondensation upon hydrolysis by water vapor in the air. The general types of silicones useful in this invention are illustrated by the following, any of which may contain other substituents for effecting cure in the various indicated systems:

(1) Copolymers of dimethylsiloxane, monomethylsiloxane, monophenylsiloxane and diphenylsiloxane.

(2) Copolymers of monophenylsiloxane, monomethylsiloxane, and diphenylsiloxane.

(3) Copolymers of trimethylsiloxane and SiO₂.

(4) Copolymers of phenylmethylsiloxane, monophenylsiloxane and monomethylsiloxane.

(5) Copolymers of monophenylsiloxane and disiloxane.

(6) High molecular weight dimethylpolysiloxane.

(7) Mixtures of the above polymers.

In general resinous silicone polymers are obtained as the number of organo substituents present on silicon decreases. Also, resinous products may also be obtained from high molecular weight dimethylpolysiloxane by increasing the amount of cross-linking. When a distinctly elastomeric material is desired for the compositions of the present invention a di-substituted silicone should be employed and a cure system used which provides only limited cross-linking sufficient to vulcanize the rubber.

The preferred amount of curable fluid silicone, including curing agent if employed, is from about 74% to about 85% of the weight of the final composition.

The curable fluid silicone employed in the following example is a methyl and phenyl substituted silicone having in relatively small amount also of vinyl and hydrogen substituents on silicon to provide for curing by the platinum catalyst which is employed. This curable fluid silicone is constituted of a high polymer dimethylsiloxane fluid in which a small proportion of the organo substituents are vinyl. There is dissolved in the dimethylsiloxane a solid resinous copolymer of silica and $R_3SiO_{1/2}$ in which the R groups are principally methyl and a small proportion are vinyl. In these two compositions the vinyl represents less than 10 mol percent of the total organo substituents bonded to silicon. To this solution to resin in fluid there is added sufficient of a phenyl, methyl and hydrogen substituent fluid silicone that the hydrogen will be substantially equivalent to the amount of vinyl present. In this silicone there are substantially 3 hydrogens per 7 phenyl and methyl radicals on a mol basis.

Example No. 1

The preferred composition is as follows:

80% by weight of a catalyzed curable fluid silicone (Sylgard 182 of Dow Corning Corporation)
9.6% by weight potassium titanate fibers (Tipersul fibers by Du Pont)
9.6% by weight of hollow silica spheres (Eccospheres, Si by Emmerson-Cummings Co.)
0.8% by weight dry boric acid In compounding the foregoing composition of Example No. 1, the dry ingredients, i.e., the potassium titanate fibers, the hollow silica spheres, and the boric acid, are mixed into the liquid, i.e., the catalyzed siliconce resin.

The foregoing composition of Example No. 1 is formed into a continuous smooth sheet of the desired thickness. A sheet ¼ inch thick takes about 4 hours to cure at 120° F. The sheet has a white color, is flexible, and has a tough smooth continuous mar resistant surface, which if damaged, can be repaired by patching with additional wet material of the same composition, much the same as patching a hole in plaster or cement.

An additional advantage of the present invention is that a sheet of greater thickness, i.e., up to one foot, also will cure in about 4 hours at 120° F. Thus, the need for applying numerous thin layers is obviated.

The foregoing sheet is bonded to a substrate by using a suitable bonding agent (such as Dow Corning Silastic No. 140, or any other adhesive that bonds silicone type rubber) which is chosen to withstand the intended operating temperature. Otherwise, the bonding agent is not critical. The flexible sheet is directly laid on the irregular adhesive covered substrate and conforms to the curvature thereof.

The composition of Example No. 1 also is trowelled into place on a metal substrate by treating the metal with a suitable primer, such as a dilute solution of a silicone type resin, and directly applying the composition to the metal in the final desired thickness. This method of application is particularly useful when an irregular, rivet head studded, hard to reach area is to be protected by thermal insulating material.

The composition of Example No. 1 also is performed into an irregular shape and bonded directly to a correspondingly shaped substrate by a suitable adhesive.

The composition of Example No. 1 also is molded directly onto an irregularly shaped substrate.

Although various other examples will be given hereinafter, the optimum performance data which follows is based on the foregoing preferred composition of Example No. 1. The composition of Example No. 1 has a density of 49 lbs./ft.$^3$, and a specific heat of 0.32 B.t.u./lb.-° F. at 100° F. and 0.33 B.t.u./lb-° F. at 900° F. The composition of Example No. 1, when bonded to a metal substrate and soaked four hours in jet fuel, is unaffected; its surface is similarly unaffected by exposure to jet fuel and hydraulic fluid for a period of two hours. The composition of Example No. 1 has a Rex hardness of 75 to 80. Coatings one-fourth inch thick made from the composition of Example No. 1 are deformed 180° and return to their original shape without coating failure.

The ablation results of the preferred composition described in Example No. 1 as compared to present ablation materials are shown in FIGS. 1 and 2. The composition of Example No. 1 is suitable in ablation environments exceeding 4000° F. When used as a thermal insulation, the present material can be used for short times at 950° F. although for extended use 500° F. should not be exceeded. When the present composition is applied to the external surfaces of typical complex missile bodies and subjected to high velocity flight conditions, the composition of Example No. 1 out performs commercial compositions of high quality and recognized usefulness. An important feature of the present invention is that it has structural integrity by itself, and does not require a sandwich coating to protect the outer surface. This gives less weight per cubic foot of material added to a surface, since the protective coating of a material normally is a less efficient insulator than the internal material which usually has little or no mechanical integrity. Also, it is difficult to patch the skin of conventional sandwich insulations, and if damaged in flight, the inner insulation readily leaves the hollow skin and thus the vehicle soon loses all effective insulation. The high velocity flight conditions include velocities of Mach 4 and above and gas stream temperatures of 1000° F.

The following table (Table 1) shows the results of subjecting the material of Example No. 1 to high speed hot air at an angle of impediment of 10°. The only surface degradation is noticed in the highest temperature, and this is very slight.

TABLE 1

| Samples Thickness (in.) | Air Temperature (° F.) | Air Velocity (ft./sec.) | Test Time (min.) |
|---|---|---|---|
| 0.305 | 730 | 2,160 | 6 |
| 0.318 | 800 | 400 | 6 |
| 0.328 | 790 | 1,908 | 6 |
| 0.312 | 780 | 2,280 | 6 |
| 0.358 | 840 | 406 | 13 |
| 0.326 | 900 | 416 | 6 |

It is believed that the high refractive index and the small dimensions of the potassium titanate fibers, blocks the thermal radiation at high temperatures by diffuse reflectance. The low thermal conductivity resin reduces the solid conduction, while the addition of the hollow spheres reduces the thermal conductivity as well as reducing the weight of the present composite.

FIGS. 1 and 2 show the extremely improved results of the present material as an ablation material over conventional ablation materials represented by the curves A, B, and C. Curve A is a production ablation shield presently in use. Curves B and C represent the best presently known ablation materials.

Example No. 1 and Example No. 1a are of the same composition as hereinbefore described in Example No. 1, but the different densities are occasioned because Example No. 1 was filled into a honey comb in a vacuum and Example No. 1a was filled at atmospheric conditions. More air was removed from Example No. 1. The present invention is 5 times as effective as a conventional ablation material and twice as effective as the best known ablation materials.

Thus the present material is an effective ablation material even at high entholpy conditions such as are produced by a superorbital vehicle re-entering an atmosphere. Under these conditions, the volume of gaseous species produced should be of low molecular weight to provide the greatest gas volume for stopping the convective heating from the high temperature gas stream. The present composition forms a very hard and stable char layer which emits much of the incident thermal energy and also resists some of the aerodynamic forces on the material.

As the resin or binder content (the silicone material) is decreased the resultant composition will become more stiff and difficult to work. Also, some of the methods of application, such as trowelling into place, will be more difficult. However, dependent upon the filler ingredients, the density of the final material may be decreased and thermal efficiency improved. As the resin or binder content is increased the workability also will increase. However, again dependent upon the filler material, the thermal efficiency will decrease.

Utilization of the present invention for thermal protection against considerably different environments requires an appraisal of the type of filler materials used and the ratio of filler to binder. The mechanisms of heat protection provided by the material must be considered and the formulation adjusted to incorporate the optimum ingredients in the optimum ratio. Where the material is used as insulation against temperatures below 1000° F., a low thermal conductivity and density and high specific heat are important. However, if the present invention is used at very high heat fluxes or enthalpies, then, in addition, the amount of vapor produced, vapor molecular weight and endothermic reactions become important. The char layer formation also is important in this type application.

In the following table, Table 2, various other formulations together with pertinent characteristics thereof are presented. These compositions also are made in accordance with the present invention and have densities ranging from approximately 45 to 60 lbs./ft.$^3$.

TABLE 3

| Comp. No. | Composition in Weight Percent | | | | | | | Properties | | | | |
|---|---|---|---|---|---|---|---|---|---|---|---|---|
| | Silicone and Curing Agent | Fibrous Mat. Potassium Titanate | Cellular Mat. Hollow Spheres of SiO$_2$ | Asbestos Long Fibers | Boric Acid Dry | Thinner Toluene | Filler Clay | Visual Appearance | Adhesion to Metal | Toughness and Flexibility | Migration of Filler | Ease of Appln. |
| 1 | 78.1 | 11.7 | 8.7 | 1.0 | 0.5 | | | G | F | B | S | G |
| 2 | 75.8 | 11.3 | 8.5 | 1.0 | 0.4 | 3.0 | | G | F | B | M | G |
| 3 | 70.5 | 10.5 | 7.9 | 0.9 | 0.4 | 9.8 | | G | F | B | M | G |
| 4 | 64.1 | 9.6 | 7.2 | 0.8 | 0.4 | 17.9 | | P | F | F | S | G |
| 5 | 59.5 | 8.9 | 6.7 | 0.7 | 0.4 | 23.8 | | VP | VP | VP | N | VD |
| 6 | 78.1 | 11.7 | 8.7 | 1.0 | 0.5 | | 0.8 | G | F | B | S | F |
| 7 | 76.8 | 10.7 | 10.7 | 0.9 | 0.9 | | | VG | G | VG | N | G |
| 8 | 79.6 | 10.9 | 8.1 | 0.9 | 0.5 | | | VG | VG | VG | N | G |
| 9 | 80.5 | 12.2 | 7.3 | | | | | VG | G | VG | N | G |
| 10 | 80.5 | 7.3 | 12.2 | | | | | VG | G | VG | N | G |
| 11 | 82.5 | 2.5 | 15.0 | | | | | VG | G | VG | N | G |
| 12 | 80.6 | 9.7 | 9.7 | | | | | VG | VG | NOT | N | G |

The symbols listed in Table 3 have the following meaning:

G—Good  
VG—Very Good  
F—Fair  
P—Poor  
VP—Very Poor  
S—Slight  
M—Moderate  
N—None  
VD—Very Difficult  
E—Extensive  
B—Brittle  
NOT—Not Too Tough  
GF—Good Flexibility This invention is intended to cover all changes and modifications of the example of the invention herein chosen for purposes of the disclosure, which do not constitute departures from the spirit and scope of the invention.

What is claimed is:

1. A thermal insulation and ablation material comprising:
    (a) about 80% by weight of a cured organopolysiloxane made from a methyl and phenyl substituted fluid organopolysiloxane curable by a platinum catalyst to a flexible elastomeric solid and constituted of:
        (1) a high polymer dimethyl siloxane fluid having a small proportion of vinyl substituents and having dissolved therein a solid resinous copolymer of silica and $R_3SiO_{1/2}$ in which the R groups are principally methyl with a small proportion of vinyl, the total vinyl constituting less than 10 mol percent of the total organo substituents bonded to silicon in the fluid, and
        (2) an amount of phenyl, methyl and hydrogen substituted fluid silicone having substantially 3 hydrogens per 7 phenyl and methyl radicals on a mol basis sufficient to provide substantially equivalent hydrogen and vinyl in the organopolysiloxane,
    (b) about 9.6% by weight of hollow silica spheres,
    (c) about 9.6% by weight of potassium titanate fibers, and
    (d) about 0.8% by weight of dry boric acid,
    said material being applicable in its wet form to a substrate in a single coating of desired thickness and being formable into a continuous tough smooth surfaced flexible resilient sheet suitable for bonding to an irregular substrate.

2. A fluid composition for thermal insulation or ablative heat protection comprising:
    (a) a major proportion of a methyl and phenyl substituted organopolysiloxane curable by a platinum catalyst to a flexible elastomeric solid and constituted of:
        (1) a high polymer dimethyl siloxane fluid having a small proportion of vinyl substituents and having dissolved therein a solid resinous copolymer of silica and $R_3SiO_{1/2}$ in which the R groups are principally methyl with a small proportion of vinyl, the total vinyl constituting less than 10 mol percent of the total organo substituents bonded to silicon in the fluid, and
        (2) an amount of a phenyl, methyl and hydrogen substituted fluid silicone, having substantially 3 hydrogens per 7 phenyl and methyl radicals on a mol basis, sufficient to provide substantially equivalent hydrogen and vinyl in the organopolysiloxane,
    (b) from about 2.5% to about 26.5% of an inorganic fibrous material having radiant heat transfer suppressing properties; and
    (c) from about 5% to about 22.5% of cellular particles selected from the groups consisting of glassy spheres, expanded cellular perlite, expanded mica, plastic spheres, fused clay spheres, SiO$_2$ spheres, alumina spheres, and zirconia spheres, said percentages being by weight of the composition.

3. The composition defined in claim 2, including up to about 5% of an antiflaming material.

4. The composition defined in claim 2, wherein said fibrous material is potassium titanate fibers.

5. The composition defined in claim 2, wherein said fibrous material and said cellular material constitute from about 5% to about 26.5% of the composition.

References Cited by the Examiner

UNITED STATES PATENTS

| | | |
|---|---|---|
| 2,495,306 | 1/1950 | Zurcher. |
| 2,650,206 | 8/1953 | Stock. |
| 2,806,509 | 9/1957 | Bozzacco et al. |
| 2,884,380 | 4/1959 | Cook et al. |
| 3,014,872 | 12/1961 | Scott _____ 162—152 |
| 3,050,491 | 8/1962 | Nitzsche et al. |
| 3,055,831 | 9/1962 | Barnett et al. _____ 260—38 |
| 3,061,495 | 10/1962 | Alford _____ 106—40 |
| 3,103,254 | 9/1963 | Stedman. |

(Other references on following page)

FOREIGN PATENTS 507,544   11/1954   Canada.

OTHER REFERENCES

Epstein et al.: Industrial and Engineering Chemistry vol. 52, September 1960; pgs. 764, 765, 766, 767.

"Fire-Resistant and Fire-Retardant Compositions—Patent Survey" (Ware et al.) Circular 727, published by National Paint, Varnish and Lacquer Association, Inc., July 1948, pages 26–28 relied on.

Grundfest: Chemical Engineering, vol. 66; June, 1959; pgs. 134, 136, and 138.

MORRIS LIEBMAN, *Primary Examiner.*

LESLIE H. GASTON, *Examiner.*

J. W. BEHRINGER, A. H. KOECKERT, S. L. FOX,
*Assistant Examiners.*